W. HESS, Jr.
DEVICE FOR MEASURING GRAPHIC RECORDS.
APPLICATION FILED SEPT. 4, 1919.
1,376,768.
Patented May 3, 1921.
5 SHEETS—SHEET 1.
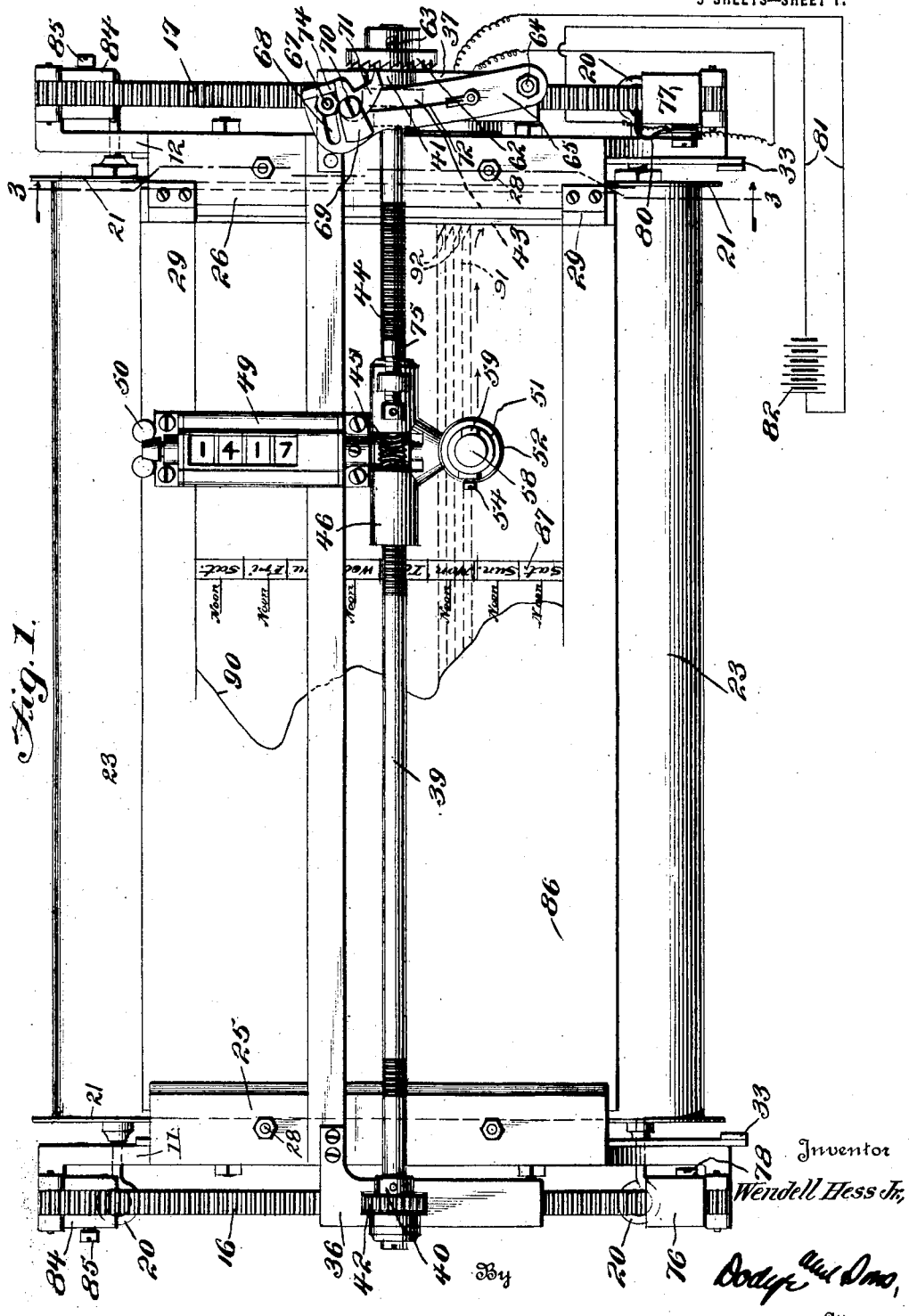

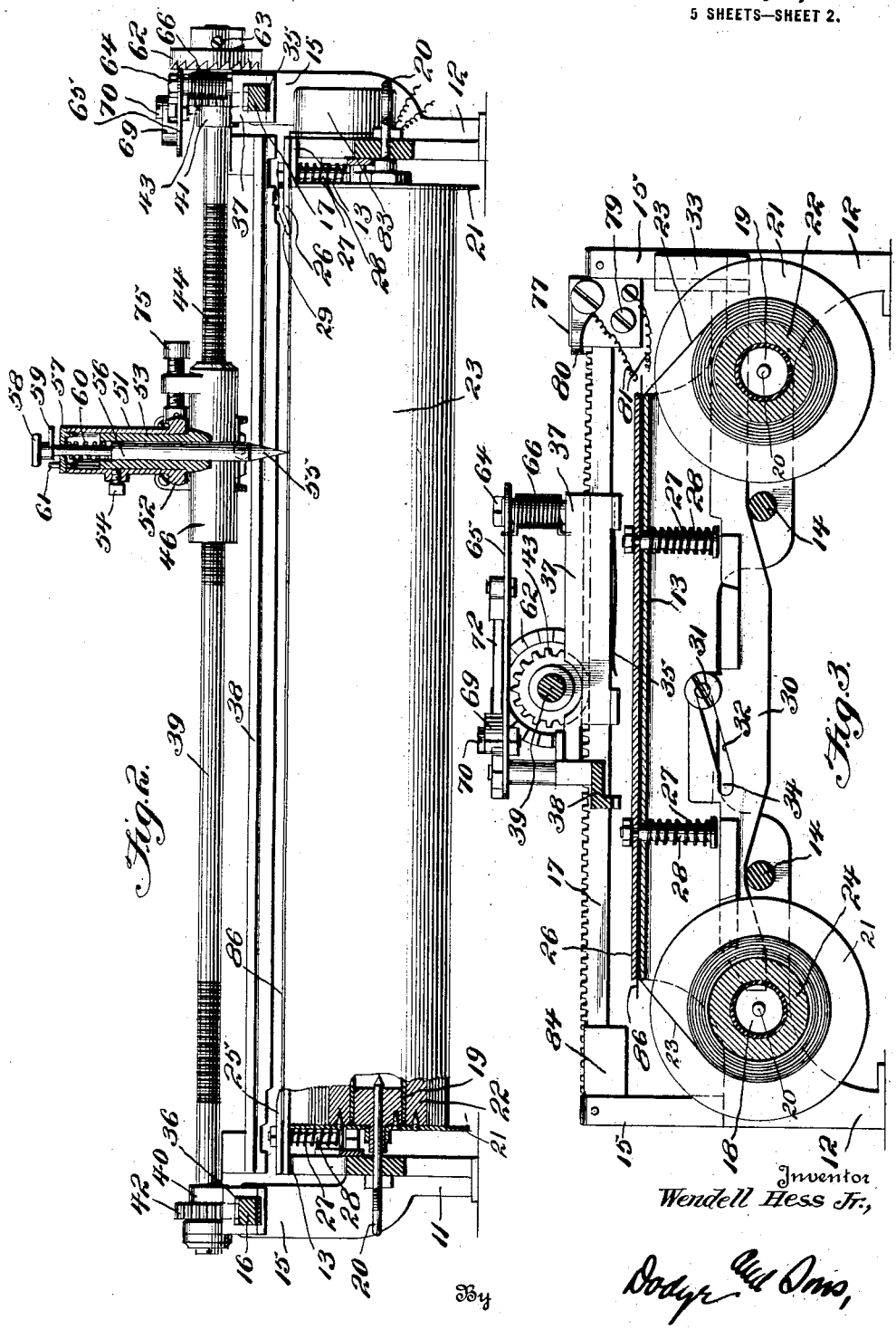

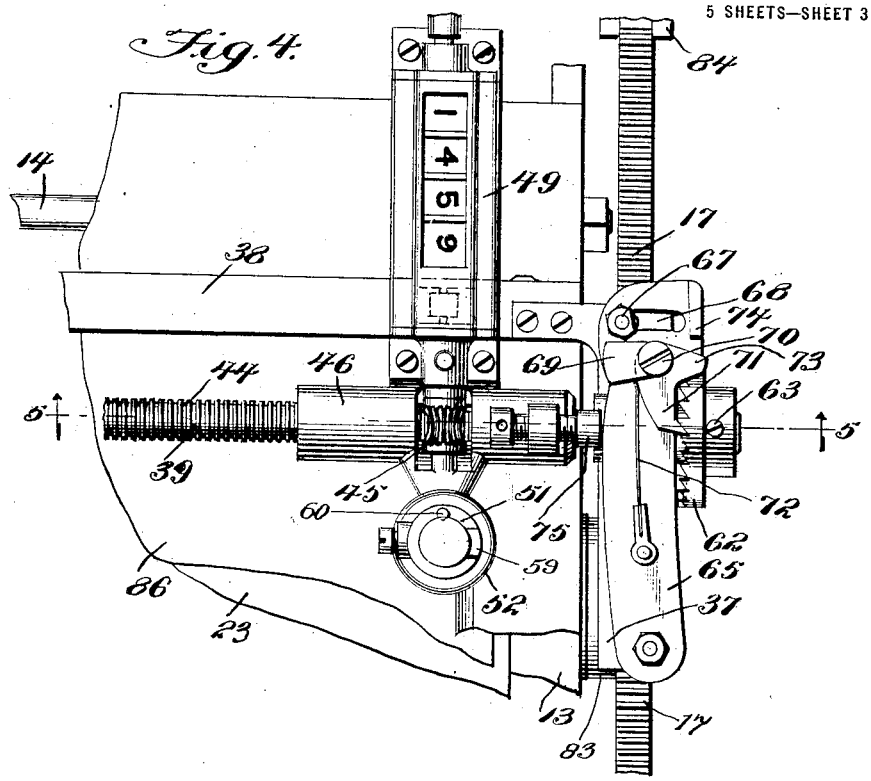
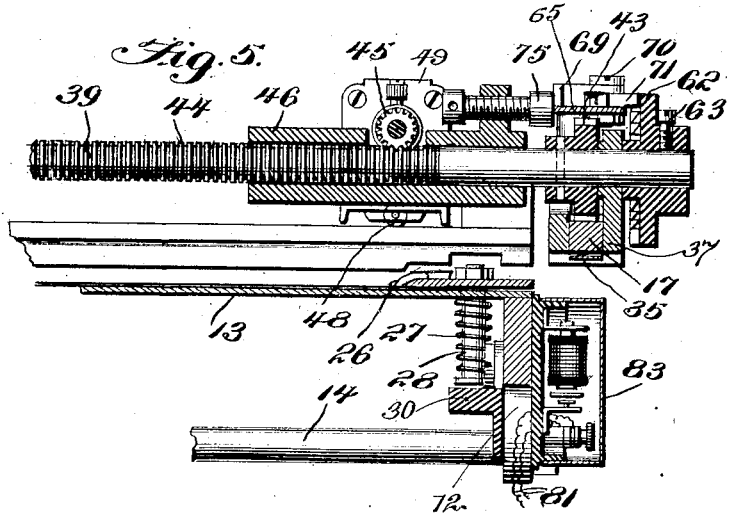

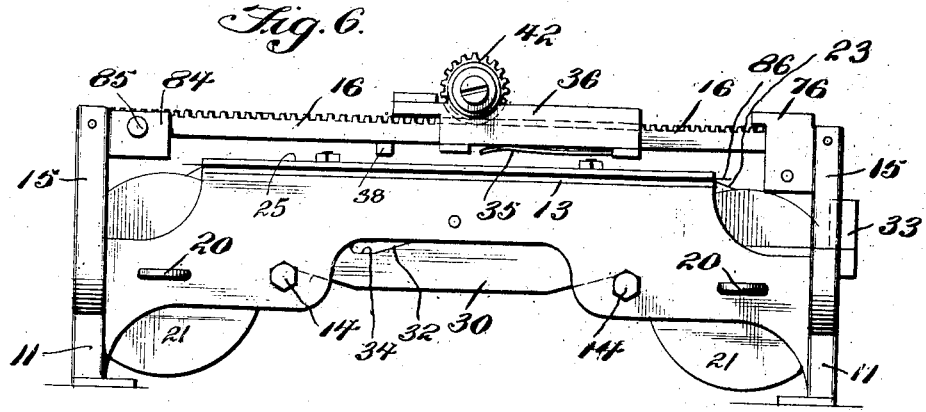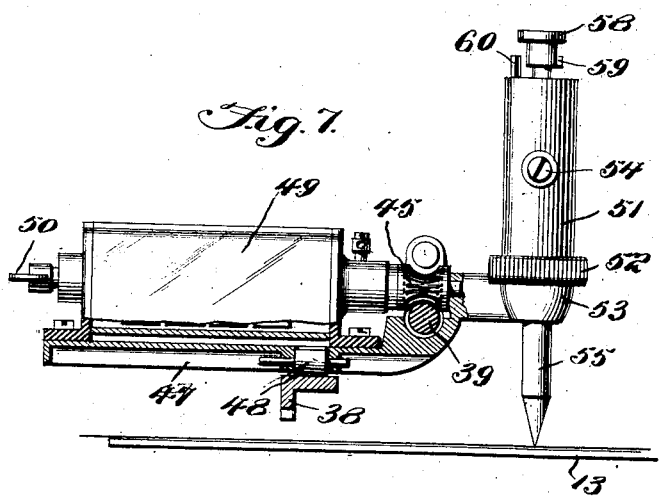

W. HESS, Jr.
DEVICE FOR MEASURING GRAPHIC RECORDS.
APPLICATION FILED SEPT. 4, 1919.
1,376,768.
Patented May 3, 1921.
5 SHEETS—SHEET 5.
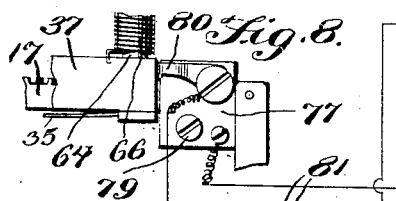
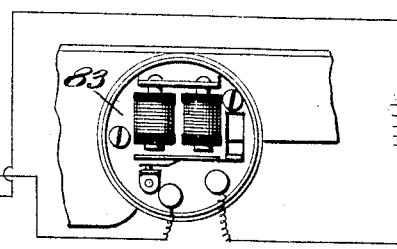
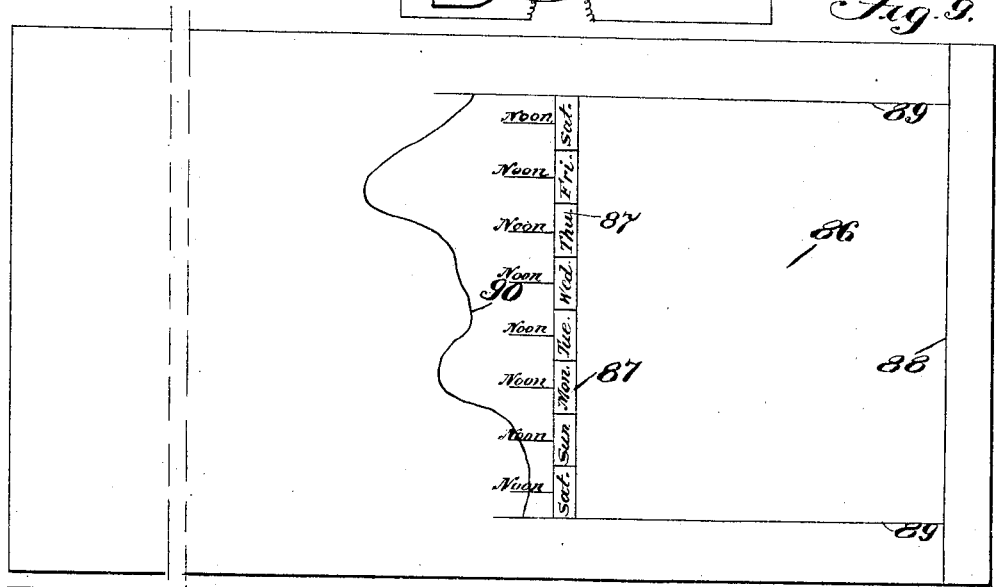
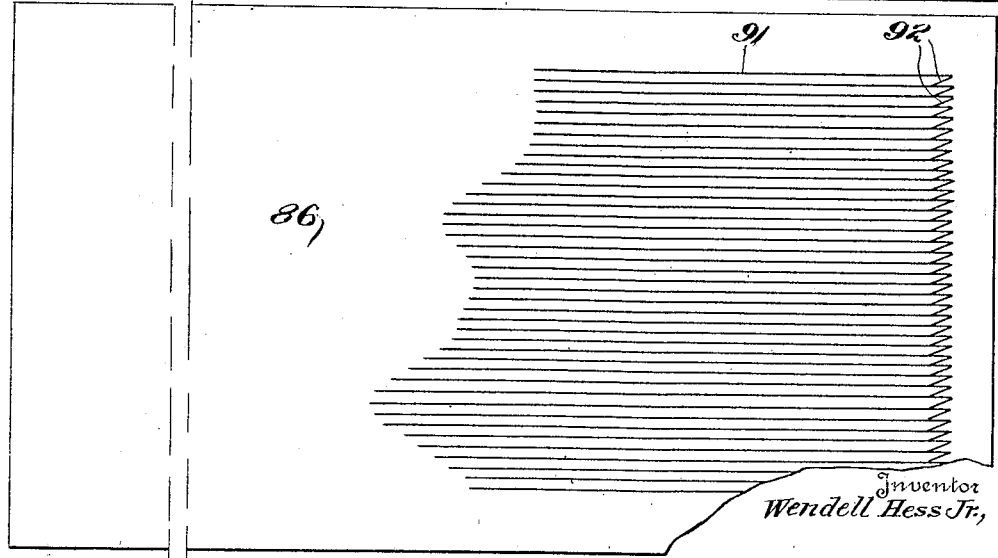
Inventor
Wendell Hess Jr.,
By
Attorneys.

UNITED STATES PATENT OFFICE.

WENDELL HESS, JR., OF TROY, NEW YORK.

DEVICE FOR MEASURING GRAPHIC RECORDS.

1,376,768.   Specification of Letters Patent.   Patented May 3, 1921.

Application filed September 4, 1919. Serial No. 321,646.

*To all whom it may concern:*

Be it known that I, WENDELL HESS, Jr., a citizen of the United States, residing at Troy, in the county of Rensselaer and State of New York, have invented a certain new and useful Improvement in Devices for Measuring Graphic Records, of which the following is a specification.

This invention relates to mechanical integrators and particularly to a machine for interpreting graphic records such as those made by continuous water-stage recorders, recording gages, barographs, and the like.

The machine integrates the area under the record graph by assisting the operator to traverse a stylus along a series of uniformly spaced ordinates, and by automatically recording the sum of the lengths of such ordinates on a counter or register. As a check on the accuracy of the manipulation of the device, a means is provided to draw the ordinates on the back of the record, where they do not confuse the record, and yet are available as a check on the path followed by the stylus, thus showing doubling, improper spacing, inaccurate register with the graph, and the like.

Since most of the records in question are made for uniform successive periods, and since one of the important values to be determined is the mean for such period, I equip the device with a signal to warn the operator and a stop to bring the integrator to rest at the end of each such record interval. This calls attention to the necessity for a reading, and avoids errors which otherwise might be caused by overrunning or retracing the record.

Incidental features relate to means for securing positive actuation of the counter, means for holding and feeding carbon paper, and means for clamping the record sheet.

I illustrate a satisfactory embodiment of the invention in the accompanying drawings, in which:—

Figure 1 is a plan view of the complete device, the signal circuit being shown in diagram.

Fig. 2 is an elevation looking from the right, with reference to Fig. 1. Certain parts are shown in section.

Fig. 3 is a section, slightly enlarged, on the line 3—3 of Fig. 1.

Fig. 4 is a fragmentary plan view of the counter carriage and the feed mechanism of the spacing carriage at the limit of the feeding stroke.

Fig. 5 is a section on the line 5—5 of Fig. 4.

Fig. 6 is an elevation of the end of the machine remote from the feeding mechanism.

Fig. 7 is a detail elevation of the counter carriage and stylus, parts of the spacing carriage being shown in section.

Fig. 8 is a detail view, partly diagrammatic, of the signal mechanism.

Fig. 9 is a face view of the record sheet, and

Fig. 10 shows the appearance of the rear face of the record sheet after the integrating operation.

The main frame of the machine consists of two end castings 11 and 12 tied together by a horizontal plate 13 which serves as the bed or table of the machine. The castings 11 and 12 are braced by the two tie rods 14. Each end casting has outward and upward extending arms 15, the arms 15 on the casting 11 carrying a horizontal rack bar 16, and the arms 15 on the casting 12 carrying a parallel horizontal rack bar 17. These rack bars serve as guides for the spacing carriage later to be described.

Extending between the castings 11 and 12, and journaled in the end thereof below the plate 13, are two rolls or spools 18 and 19. These turn on inserted pins 20 which may readily be withdrawn to free the spools for removal from the machine. When removed, the end-flange 21 of spool 19 may be dismounted to permit a core 22 wound with carbon paper 23 to be slipped endwise onto the spool, after which the flange and spool are remounted as before. A core 24, similarly mounted on the spool 18, has means to engage the free end of the carbon paper after the same has been drawn, face up, over the plate 13. The two spools thus offer a convenient means for feeding a web of carbon paper over the table, and the use of the removable cores permits easy insertion and threading of this paper.

The edges of the carbon paper run under two bar clamps 25 and 26. Each of these is normally drawn downward against plate 13 by a pair of coiled springs 27. These springs surround headed studs 28, fixed in the clamps 25 and 26 and extending downward through holes in the plate 13. These clamps also serve to hold the record sheet, and the clamp 26 has two indices 29 to mark the base line and abscissa limits (*i. e.*, the position of the limiting ordinates) of the record, and thus secure accurate positioning of the record on the plate 13.

Each of the clamps 25 and 26 may be released and held released by an individual lifter operating on the heads of its studs 28. These lifters are identical, and each consists of a bar 30 guided on a stud 31 which passes through an oblique slot 32 in the lifter. Each lifter has at its end a finger hook 33 by which it may be drawn to the right to cause it to rise and lift the studs 28 of the corresponding clamp. At the end of such motion the stud 31 enters a dwell 34 in the slot 32 which retains the parts in position until the lifter is forced part way back. In their lowered positions the two lifters rest on the tie-rods 14.

It is to be understood that during the measurement of a record the carbon paper does not move. The rolls are provided merely to facilitate handling of the carbon paper, and it is held flat and face up, on the plate 13 by the clamps 25 and 26, and by a superposed record sheet also held by these clamps, while the record is being measured. The only function of the carbon paper is to record, on the back of the record sheet, the path of the stylus during the mechanical integrating operation. In certain cases this function is not necessary, and the carbon paper and rolls may be omitted.

Mounted to slide on the parallel rack-bars 16, 17 is the spacing carriage composed of the two sliding heads 36 and 37 and the connecting bar 38. Friction springs 35 give considerable resistance to motion. A cylindrical rod 39 extends between heads 36 and 37 at right angles to the rack bars 16 and 17. It is mounted to turn in bearings 40 and 41, and carries gears 42 and 43 of equal dimensions which mesh with the teeth on the rack bars 16 and 17. Consequently it rotates as the carriage moves along the rack bars 16 and 17 and serves to constrain the heads 36 and 37 to move at equal rates at all times. The rod 39 is not threaded, as might be assumed from a hasty examination of the drawing, but is formed with annular rack teeth 44 throughout its length. By means of these it meshes with the close-fitting gear wheel 45.

The gear wheel 45 is mounted to turn in bearings in the counter carriage which slides longitudinally on the rod 39. This carriage comprises a sleeve 46 guided directly on the rod 39, and a lateral extension 47 which carries a roller 48 running on the connecting bar 38. This roller receives the thrust of the spring pressed stylus, which is also carried by this carriage.

Mounted on the extension 47 is a set-back counter 49, whose set-back key is shown at 50. This counter is driven by the gear 45 through a ratchet connection forming a part of ordinary commercial counters, and hence not here shown in detail. The effect of this ratchet connection is to cause the gear to move the counter when the gear rotates in one direction, and to leave it at rest when the gear rotates in the reverse direction.

Mounted on the side of the sleeve 46 opposite the extension 47 is the stylus guide tube 51. This has a milled finger grip 52 by which the counter carriage may be moved back and forth. A guide bushing 53 is clamped in this tube by the set screw 54, and guides the metal stylus 55. This is shouldered at 56, and extends upward through the cap 57, above which it terminates in a button 58 and stop lug 59. A spring 60 confined between this cap and shoulder urges the stylus down against the plate 13 or a record clamped thereon. By drawing up button 58 and turning it slightly, the lug 59 can be engaged with a stop 61 on the cap 57 to hold the stylus clear of the plate 13.

By traversing the counter carriage along the rod 39, so that the stylus point moves from the record base line adjacent indices 29 to the record graph on the record sheet undergoing measurement, and back to the base line the height of the ordinate at that point will be registered by the counter 49. To secure continuous operation, means are provided whereby, at the completion of each such operation, the spacing carriage will be moved a chosen constant distance, ready to measure the next ordinate of the series.

This means consists of a ratchet feed mechanism, operated by the counter carriage at the end of its travel, to rotate the shaft 39 through a definite angle. The shaft 39 extends beyond the bearing 41, and carries at its end a ratchet wheel 62, the ratchet teeth being on the face of the wheel. This wheel is clamped by a screw 63 to permit angular adjustment of the wheel with reference to the shaft, and to permit the substitution of wheels having different numbers of teeth. The number of teeth determines the spacing interval between successive ordinates, and this should be coördinated with the scale of the record.

Mounted on the head 37 is a vertical stud 64 on which swings a horizontal arm 65. This arm is urged in a counter-clockwise direction by a spring 66 which is coiled around the stud 64. A second stud 67, also carried by the head 37, extends through a slot 68 in the end of the arm 65 and limits the swinging movement of this arm. Near the end of the arm 65 is an under-cut boss 69. A screw 70 passes through this boss and serves as a pivot for the pawl 71. This pawl is urged toward the ratchet wheel 62 by a leaf spring 72, and is limited in such motion by an arm 73 formed on the pawl and positioned to collide with a stop 74 formed on the arm 65.

The arm 65 is actuated by the counter carriage through an adjustable threaded stop 75 carried by a boss on the sleeve 46. The adjustment of this stop permits the parts to be so set that the counter carriage is arrested with the stylus exactly at the base line of the record.

When the counter carriage is away from the feed arm 65, this swings back and carries the pawl 71 clear of the ratchet wheel 62. (See Fig. 1.) In this position of the parts the pawl is swung by the spring 72 toward the ratchet wheel 62 as far as the stop 74 will permit. As the counter carriage moves toward the feed mechanism, stop 75 strikes and moves arm 65. Pawl 71 engages a tooth of the ratchet wheel and swings about its pivot, as the arm 65 moves, in such manner as to rotate the ratchet wheel one tooth. (See Fig. 4.) As the counter carriage moves away, the springs 66 and 72 restore the parts to their former positions.

In order to arrest the spacing carriage at the end of a record, I provide the stops 76 and 77 mounted on the racks 16 and 17 respectively. Each of these is adjustable on its rack by means of the clamp screws 78 and 79, so that the stops can be set to arrest the carriage at any desired point. To warn the operator to stop I provide an audible signal which sounds when the stops function. This consists of an insulated contact arm 80 mounted on stop 77 which is forced into electrical contact with the stop 77 by the head 37, thus closing a circuit through flexible wires 81, battery 82 and buzzer 83. This signal is desirable, as the operator might otherwise operate the counter carriage back and forth more than once on the last ordinate, thus introducing error. As a further provision against the introduction of such error, the ratchet in counter 49 is so arranged as to drive the counter when the counter carriage moves toward the spacing feed ratchet wheel 62. Thus a slight movement of the counter carriage away from the feed ratchet wheel 62, i. e., away from the base line of the record, will not affect the reading of the counter.

To determine the starting point of the spacing carriage I provide stops 84, clamped in adjusted positions on the rack bars 16 and 17 by the set screws 85.

To prepare the machine for use the roll of carbon paper is put into place and properly threaded up. The record sheet to be measured is put in place under the clamps 25 and 26, care being taken to secure register of its base line and limiting ordinates with the indices 29. The stop 75 is so set that the counter carriage can move just far enough to bring the point of the stylus to the base line of the record. Stops 76 and 77 are set at the desired limit.

Stops 84 are so set that the carriage can move just far enough for the stylus to register with the limiting ordinate of the record when the record is clamped in proper relation to indices 29. The stylus is placed on this limiting ordinate at its intersection with the base line. The measuring operation can now be performed as follows:

The counter carriage is moved to carry the point of the stylus to the record graph, then back to the base line, continuing alternately back and forth between the base line and graph, until the mechanism is arrested by the stops 76 and 77. The counter 49 will then give a reading proportional to the area under the curve and the mean value for the height of the graph may be computed by multiplying the proper factor which is dependent on the scale of the record and the drive ratio of the counter. Where the machine is to be used to measure a single standardized type of record, the scale of the record may be so coördinated with the drive ratio of the counter that the latter will read directly in total area. If the interval between the abscissa limits of the records be a constant, the counter may be made to give directly the mean value of the ordinate by a proper coördination of the scale of the record and drive ratio to the counter. Such arrangements are convenient in special cases, but as a rule a broader range of utility can be secured by use of the conversion factor with a counter reading directly in units of area under the curve.

It will be observed that the machine integrates the area under the curve by finding the sum of the lengths of a series of equally spaced ordinates, and that the accuracy of the method increases as the number of ordinates is increased. In Fig. 9 I show the general appearance of the face of a record suitable for measurement in this machine, and covering a period of seven successive days, arbitrarily chosen from noon Saturday to noon Saturday. The record sheet is indicated at 86. The abscissa designations in days are shown at 87, the base line at 88 and the abscissa limits (i. e., the points of intersection of the limiting ordinates with the base line) at 89. The record graph is shown at 90.

In Fig. 10 I show the back of the record sheet as it appears after measurement in this machine. The parallel lines 91 are the path of the stylus, the oblique connecting lines 92 being the path of the stylus during the feeding movement of the spacing carriage. Failure of the carriage to feed fully would be shown by irregular spacing of the lines 91, and doubling on the same line, by the relative darkness of the doubled line.

By viewing the record by transmitted light the coincidence of the ends of the lines 91 with the record graph 90 can be checked. Thus, without confusing the record the lines 91 offer a very useful check on the manipulation of the machine.

While I have referred to the member 55 as a stylus, because of its marking function when the carbon paper is used, this member is functionally primarily a pointer and I refer to it as such in certain of the claims.

Having thus described my invention what I claim is:—

1. In a device for measuring the areas of graphic records, the combination of a support for the record; a movable pointer; guiding means for said pointer including a right line guide and automatic guide-shifting means serving to constrain said pointer to a path consisting of successive parallel uniformly spaced straight lines, whose length may be determined by the operator to conform to the outline of the graphic record; and recording means actuated by the movements of the pointer and giving directly the sum of the lengths of the parallel straight lines traversed by the pointer.

2. In a device for measuring the areas of graphic records, the combination of a support for the record; a movable pointer; guiding means for said pointer including a right line guide and automatic guide-shifting means serving to constrain said pointer to a path consisting of successive parallel uniformly spaced straight lines, whose length may be determined by the operator to conform to the outline of the graphic record; recording means actuated by the movements of the pointer and giving directly the sum of the lengths of the parallel straight lines traversed by the pointer; and means for marking on the record the path traversed by the pointer.

3. In a device for measuring the areas of graphic records, the combination of a support for the record; a stylus adapted to move over the face of the record in contact therewith; guiding means for said stylus adapted to constrain it to a path consisting of successive parallel uniformly spaced straight lines, whose length may be determined by the operator to conform to the outline of the graphic record; recording means actuated by the movements of the stylus, and giving directly the sum of the lengths of the parallel straight lines traversed by the stylus; and means for positioning a carbon sheet upon the record support and beneath a record sheet held thereby, to record on the back of the record sheet the path traversed by said stylus.

4. In a device for measuring the areas of graphic records, the combination of a support for the record; a guide on said support adapted to position a record accurately thereon; a movable pointer; guiding means for said pointer including a right line guide and automatic guide-shifting means serving to constrain said pointer to a path made up of successive parallel uniformly spaced straight lines, whose length may be determined by the operator to conform to the outline of the graphic record; recording means actuated by the movements of said pointer to give directly the sum of the lengths of said lines; and stops limiting the extreme movement of said pointer in directions perpendicular to said parallel line paths.

5. In a device for measuring the areas of graphic records, the combination of a support for the records; a guide on said support adapted to position a record accurately thereon; a movable pointer; guiding means for said pointer including a right line guide and automatic guide-shifting means serving to constrain said pointer to a path made up of successive parallel uniformly spaced straight lines, whose length may be determined by the operator to conform to the outline of the graphic record; recording means actuated by the movements of said pointer to give directly the sum of the lengths of said lines; stops limiting the extreme movement of said pointer in directions perpendicular to said parallel line paths; and means for marking on said record sheet the path traversed by said pointer.

6. In a device for measuring the areas of graphic records, the combination of a support for a record sheet; a right line guide on said support; a carriage mounted on said guide; a right line guide on said carriage transverse to said first guide; a second carriage mounted in the last named guide; a recorder for giving a totalized record of the reciprocative movements of one of said carriages; and a feeding mechanism actuated by such reciprocative movements to impart a step-by-step feeding movement to the other of said carriages.

7. In a device for measuring the areas of graphic records, the combination of a support for a record sheet; a right line guide in said support; a carriage mounted on said guide; a right line guide transverse to said first guide and mounted on said carriage; a second carriage mounted on the last named guide; a recorder for giving a totalized record of the reciprocative movements of one of said carriages; a feeding mechanism actuated by such reciprocative movements to impart a step-by-step feeding movement to the other of said carriages; guides for positioning a record on said record support; stops for limiting the extreme movements of the intermittently fed carriage; and means permitting the adjustment of said stops to coördinate them with said record-positioning guides.

8. In a device for measuring the areas of graphic records, the combination of a support for a record sheet; a right line guide on said support; a carriage mounted on said guide; a right line guide transverse to said first guide and mounted on said carriage; a second carriage mounted on the last named guide; a recorder for giving a totalized record of the reciprocative movements of one of said carriages; a feeding mechanism actuated by such reciprocative movements to impart a step-by-step feeding movement to the other of said carriages; guides for positioning a record on said record support; stops for limiting the extreme movements of the intermittently fed carriage; means permitting the adjustment of said stops to coördinate them with said record-positioning guides; and an audible signal actuated through the collision of said intermittently fed carriage with one of said stops.

9. In a device for measuring the areas of graphic records, the combination of a support for a record sheet; means for positioning and holding a record thereon; a right line guide on said support; a carriage mounted on said guide; a right line guide transverse to said first guide and mounted on said carriage; a pointer mounted on the second named guide; a recording mechanism actuated by the movements of said pointer on said carriage, and adapted to give a reading proportional to the total distance of such movement; and a step-by-step feeding mechanism for the carriage operable by successive reciprocative movements of the pointer.

10. In a device for measuring the areas of graphic records, the combination of a support for a record sheet; means for positioning and holding a record thereon; a right line guide on said support; a carriage mounted on said guide; a right line guide transverse to said first guide and mounted on said carriage; a pointer mounted on the second named guide; a recording mechanism actuated by the movements of said pointer on said carriage; and adapted to give a reading proportional to the total distance of such movement; a step-by-step feeding mechanism for the carriage operable by successive reciprocative movements of the pointer; and means for marking on said record the path traversed by said pointer.

11. In a device for measuring the areas of graphic records, the combination of a support for a record sheet; means for positioning and holding a record thereon; a right line guide on said support; a carriage mounted on said guide; a right line guide transverse to the first named guide and mounted on said carriage; a pointer mounted on the second named guide; a recording mechanism actuated by the movements of said pointer on said carriage, and adapted to give a reading proportional to the total distance of such movement; a step-by-step feeding mechanism for the carriage operable by successive reciprocative movements of the pointer; and adjustable stops for limiting the movements of said carriage.

12. In a device for measuring the areas of graphic records, the combination of a support for the record sheet; a right line guide on said support; a carriage mounted on said guide; a second right line guide transverse to the first named guide and mounted on said carriage; a second carriage on said second named guide; a pointer carried by the second carriage and adapted to point to the record graph; a recording device to measure the sum of the successive movements of the second carriage on the first; and a feeding mechanism operated by reciprocative movements of the second carriage, and adapted to impart a step-by-step movement to the first carriage.

13. In a device for measuring the areas of graphic records, the combination of a support for the record sheet; retaining means for positioning a record sheet in a definite position on said support; a right line guide on said support; a carriage mounted on said guide; a second right line guide transverse to the first named guide and mounted on said carriage; a second carriage mounted on the second named guide; a pointer carried by the second carriage and adapted to point to the record graph; a recording device to measure the sum of the successive movements of the second carriage on the first; a feeding mechanism operated by reciprocating movements of the second carriage, and adapted to impart a step-by-step movement to the first carriage; and adjustable stops for the first carriage.

14. In a device for measuring the areas of graphic records, the combination of a support for the record sheet; retaining means for positioning a record sheet in a definite position on said support; a right line guide in said support; a carriage mounted on said guide; a second right line guide transverse to the first named guide and mounted on said carriage; a second carriage mounted on the second named guide; a pointer carried by the second carriage and adapted to point to the record graph; a recording device to measure the sum of the successive movements of the second carriage on the first; a feeding mechanism operated by reciprocating movements of the second carriage, and adapted to impart a step-by-step movement to the first carriage; adjustable stops for the first carriage; and an audible signal operable by the collision of said first carriage with one of said stops.

15. In a device for measuring the areas of graphic records, the combination of a support; means for positioning a carbon sheet face up on said support; record-retaining means for retaining in a fixed position a record sheet superposed on said carbon sheet; a right line guide on said support; a carriage mounted on said guide; a right line guide transverse to the first named guide and mounted on said carriage; a second carriage on the second named guide; a spring-urged stylus carried by the second carriage and bearing against a record sheet held by said support; a recording device adapted to indicate the sum of the successive movements of the second carriage on the first; and a feeding mechanism operated by reciprocative movements of the second carriage and adapted to impart a step-by-step movement to the first carriage.

16. In a device for measuring the areas of graphic records, the combination of a support; means for positioning a carbon sheet face up on said support; record-retaining means for retaining in a fixed position a record sheet superposed on said carbon sheet; a right line guide on said support; a carriage mounted on said guide; a right line guide transverse to the first named guide and mounted on said carriage; a second carriage mounted on the second named guide; a spring-urged stylus carried by the second carriage and bearing against a record sheet held by said support; a recording device adapted to indicate the sum of the successive movements of the second carriage on the first; a feeding mechanism operated by reciprocative movements of the second carriage and adapted to impart a step-by-step movement to the first carriage; adjustable stops for the first carriage; and an audible signal operable by collision of said first carriage with one of said stops.

In testimony whereof I have signed my name to this specification.

WENDELL HESS, Jr.